United States Patent Office 3,657,392
Patented Apr. 18, 1972

3,657,392
POLYETHYLENE GRAFTS OF HOMO- AND COPOLYMERS OF N-VINYL AMIDES
Wiley E. Daniels, Easton, and Nathan D. Field, Allentown, Pa., and Leon Katz, Springfield, N.J., assignors to General Aniline & Film Corporation, New York, N.Y.
No Drawing. Filed July 11, 1967, Ser. No. 652,432
Int. Cl. C08f 15/00
U.S. Cl. 260—878 R
10 Claims

ABSTRACT OF THE DISCLOSURE

Polyethylene is grafted onto homopolymers and copolymers of N-vinyl amides by polymerizing ethylene in the presence of such homopolymers and copolymers in the presence of free radical catalyst at a temperature of from 0° to 300° C., preferably at 30° C. to 200° C., and a pressure of about 3,000 to 50,000 p.s.i.g. During this polymerization the ethylene becomes affixed to the backbone of said homo- and copolymers as one or more pendant long poly(ethylene) chains. The resulting products consist essentially of at least two polyethylene chains, each having an average molecular weight of at least 5,000, grafted onto a polymer backbone selected from the group consisting of homopolymers and copolymers of N-vinyl amides having relatively high tensile strength which can be cast into flexible films, and which can be blended with polypropylene for the preparation of strong dyeable films and fibers.

It is known that ethylene can be copolymerized with N-vinyl lactams, in proportions of 10:90 and 95:5 in the presence of organic solvents in which ethylene is soluble and in the presence of free radical-forming compound such as azo-bis-isobutyronitrile, organic peroxides and also oxygen as catalyst, at temperatures of from 30° to 250° C. and at pressures of 20 to 2500 atmospheres, i.e., from 294–36,750 p.s.i.g. Under such conditions of reaction, copolymers are obtained containing from about 16% to about 80% of ethylene and from about 20% to about 84% of N-vinyl lactam. The ethylene/N-vinyl lactam copolymers with an N-vinyl lactam content above 40%, are colorless to yellowish, glass-clear solids. With an N-vinyl lactam content at about 54%, the copolymers are grayish solids which are soluble in methanol to the extent of about 20%. With increasing N-vinyl lactam content, the copolymers are hydrophilic and capable of swelling in water, but dissolve in water when the N-vinyl lactam content is not less than 85–90%.

It is also known that from 10% to 30% by weight of N-vinyl pyrrolidone may be copolymerized with 70% to 90% by weight of ethylene in the absence of inert organic solvents and in the presence of a free radical compound such as azo-bis-isobutyronitrile, organic peroxides, alkali metal and ammonium persulfates, perborates and the like as catalyst at temperature of 70° C. and at pressures of about 120 atmospheres, i.e., 15,000 p.s.i.g., to yield solid copolymers having a melt index of 257 dgm./min. at 190° C., tensile strength of 1.855 p.s.i., stiffness modulus of 4,308 p.s.i. and elongation of 464%.

The prior art has also suggested the terpolymerization of ethylene with lauryl methacrylate and N-vinyl-2-pyrrolidone in solution of benzene in the presence of di-t-butyl peroxide as catalyst at a temperature of from 200° to 400° F. at a pressure in the range of from 500 to 2000 p.s.i.g. for a period of 2 to 3 hours. The resulting terpolymer has a molecular weight in the range of from 700 to 3500. Such terpolymers because of their low moleculuar weight are soft, waxy materials and as a consequence are not thermoplastic and cannot be moulded by thermal techniques.

We have discovered that preformed homopolymers and copolymers of N-vinyl amides are readily grafted by ethylene, which becomes affixed to the homopolymeric or copolymeric backbone as one or more pendant poly (ethylene) chains.

In carrying out the graft polymerization, a solution containing from about 0.1 to about 1 gram base mole (i.e., 0.1 to 1 mole of amide groups) of preformed homopolymer or copolymer of N-vinyl amide, to which was added a sufficient amount of peroxide catalyst, is charged into a 1-liter autoclave equipped with a mechanical stirrer and means of heating. The charged autoclave is evacuated and the vacuum released with pre-purified nitrogen. The evacuation and vacuum release may be repeated two or more times if desired to insure complete removal of atmospheric oxygen. The autoclave is then charged with ethylene from a compressor until the autoclave reaches an internal pressure ranging from about 3,000 to 50,000 p.s.i.g. The autoclave is then sealed off from the compressor and the stirring begun at a temperature ranging from 0° to 300° C., preferably at a temperature ranging from about room temperature to about 200° C. During the stirring and warming, if the autoclave is heated above room temperature, the internal pressure of the autoclave increases by several thousand p.s.i.g. For example, with an initial internal pressure of 10,000 p.s.i.g. and a temperature of about 30° C., the internal pressure of the autoclave increases to about 12,600 at 50° C. and rises to about 12,900 within 20 to 30 minutes of heating to a temperature of 52° C. The graft polymerization reaction takes place as signified by a pressure drop. The reaction is continued for about 6 to 24 hours until the internal pressure of the autoclave drops to about 6,000–8,000 p.s.i.g. The excess ethylene is vented from the autoclave and the white, solid mass washed with water one or more times, or with water, followed by a lower-alcohol wash. The resulting solid mass may be ground in any conventional blender, such as, for example, a Waring Blendor, with water one or more times, or with water followed by a lower liquid alcohol and vacuum dried at 65°–100° C. for 12–30 hours.

It is to be noted that the charging of the autoclave with ethylene, the higher the internal pressure that is used, i.e., as it is increased from 3,000 to 10,000 to 20,000, etc., the higher the average molecular weight will be more ethylene available for the graft polymerization onto the homopolymers and copolymers of said N-vinyl amides if other variables are held constant. In other words, under higher internal ethylene pressures, there will be more ethylene available for the graft polymerization reaction, and as a consequence one or more longer polyethylene segments of increased average molecular weight.

The grafted polymers prepared in accordance with the present invention, when employing a preformed homopolymer of N-vinyl amide, differ from the usual copolymers, which normally contain two chemically different polymerized monomeric units in a more or less irregular sequence. In other words, they are not random copolymers in which the monomeric units or groups are distributed along a chain in random order as is the case in the conventional type of commercial copolymer and the copolymers of the foregoing prior art.

From a study of several grafted polymers prepared from homopolymers and copolymers of N-vinyl amides in accordance with the present invention and their degradation products which were subjected to elemental analysis, vapor-phase chromatography, infrared and nuclear magnetic resonance, we concluded that they are grafted polymers which contain branches of varying hydrocarbon chain links made up of polyethylene units on a common backbone or trunk chain. In other words, the backbone of the grafted polymer is composed entirely of N-vinyl amide monomers as such or in random order with a different copolymerizable monomer, while branches off the sides are composed of at least one or more polyethylene units having an average molecular weight of at least 5,000.

In addition to the foregoing studies, we found, by measurements using the Differential Scanning Calorimeter, Perkin-Elmer Corp., that these branches (polyethylene units) are of appreciable molecular weight as demonstrated by crystalline melting points which are in the range between 95° C. and about 125° C. and which are typical of high molecular weight polyethylene. By reference to page 310 of the Raff & Allison text on "Polyethylene" (1956) edition, published by Interscience Pub. Inc., New York, N.Y., it will be noted that polyethylenes having such crystalline melting points have molecular weights in the order of about 5,000 and higher. Appreciable crystallinity of several grafted polymers prepared in accordance with the present invention was demonstrated by large endotherms during the crystalline melting point determinations and also independently by X-ray measurements. By comparison, a commercial sample of polyethylene was shown to have 42% crystallinity by X-ray measurements. A straight polyethylene prepared in accordance with the present invention showed a crystallinity of about 48%; whereas the graft polyethylene portion of the grafted polymers prepared in accordance with the invention showed crystallinity in the order of 45–47%.

The high molecular weight of the grafts was also demonstrated by high tensile strengths of the grafted polymers, which are in the range of at least 1,000 to about 2,500 p.s.i., and also on many of the graft polymers by high intrinsic viscosities in the order of about at least 0.4 and higher, as measured on solutions having a concentration of 1.00 gram of the grafted polymer per deciliter of xylene at 90° C. Other indications of the high molecular weight are the ease of casting the grafted polymers into flexible films and the high strength of the blend of grafted polymer in polypropylene. The latter is of particular advantage in the preparation of strong dyeable propylene films and fibers without sacrificing the properties of the polypropylene.

To determine the percent of the charged homopolymer or copolymer of N-vinyl amide that was grafted by the ethylene, the ratio in percent (A) is first calculated by dividing the weight of the preformed homopolymer or copolymer by the weight of grafted polymer or copolymer resulting from the polymerization reaction. The grafted polymer or copolymer is analyzed for percent nitrogen and the resulting figure converted to percent of homopolymer or copolymer content in the grafted product. The latter figure, in percent, is then divided by the figure of (A) multiplied by 100. This determination will be more fully described in some of the illustrative working examples given hereinafter.

The preformed homopolymers of N-vinyl amides that are employed in the foregoing graft polymerization reaction include N-alkyl-N-vinyl acetamides such as, for example, N-methyl-N-vinyl acetamide, N-ethyl-N-vinyl acetamide, N-propyl-N-vinyl acetamide, N-isopropyl-N-vinyl acetamide, N-pentyl-N-vinyl acetamide, N-2-ethyl-hexyl-N-vinyl acetamide, N-phenyl-N-vinyl acetamide, N-benzyl-N-vinyl acetamide, N-tolyl-N-vinyl acetamide, N-cyclohexyl-N-vinyl acetamide, and the like, N-vinyl succinimide, N-vinyl diglycolylimide, N-vinyl glutarimide, N-vinyl-3-morpholinone, N-vinyl-5-methyl-3-morpholinone, N-vinyl-5-ethyl-3-morpholinone, N-vinyl oxazolidone; N-vinyl lactams and thiolactams of the formula:

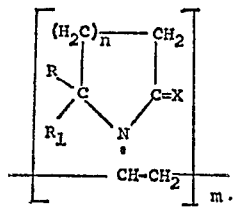

wherein R and $R_1$ are selected from the group consisting of hydrogen, methyl and ethyl, $n$ is an integer of from 1 to 3, $m$ represents the average number of molecules described by the formula, and X represents either oxygen or sulfur.

The homopolymers of the foregoing N-vinyl amides are readily obtained by homopolymerizing them by any of the conventional procedures. Specifically, the homopolymers of the N-vinyl lactams characterized by the foregoing formula are also readily obtained by homopolymerizing by conventional procedures N-vinyl pyrrolidone; N-vinyl-5-methyl pyrrolidone; N-vinyl-5-ethyl pyrrolidone; N-vinyl-5,5-dimethyl pyrrolidone; N-vinyl-5,5-diethyl pyrrolidone and N-vinyl-5-methyl-5-ethyl pyrrolidone; N-vinyl piperidone; N-vinyl-6-methyl piperidone; N-vinyl-6-ethyl piperidone; N-vinyl-6,6-dimethyl piperidone; N-vinyl-6,6-diethyl piperidone and N-vinyl-6-methyl-6-ethyl piperidone; N-vinyl caprolactam, N-vinyl-7-methyl caprolactam; N-vinyl-7,7-dimethyl caprolactam; N-vinyl-7-ethyl caprolactam; N-vinyl-7,7-diethyl caprolactam and N-vinyl-7-methyl-7-ethyl caprolactam and their corresponding thiolactams.

For the purpose of the present invention we employ homopolymers of N-vinyl amide monomers having a K value ranging from about 15 to 140, preferably from about 30 to 100. As noted above, these homopolymers are readily obtained by conventional homopolymerization procedures described in U.S. Pats. 2,265,450; 2,317,804; 2,335,454 and many others too numerous to mention in which working examples are given.

All of the homopolymers of N-vinyl lactams referred to above are soluble in water, alcohols and a certain class of organic solvents.

Instead of employing preformed homopolymers of the foregoing N-vinyl amides, copolymers obtained by copolymerizing 5 to 99 mole percent of the foregoing N-vinyl amides with 1 to 95 mole percent of a different N-vinyl amide such as, for example, N-vinyl pyrrolidone with N-methyl-N-vinyl acetamide, or N-vinyl pyrrolidone with N-vinyl piperidone or N-vinyl pyrrolidone with N-vinyl caprolactam, or N-vinyl piperidone with N-vinyl-6-methyl vinyl piperidone or N-vinyl caprolactam with N-vinyl oxazolidone, and the like, may also be copolymerized and the resulting copolymer grafted with ethylene in accordance with the present invention. Also copolymers obtained by copolymerizing 5 to 99 mole percent of any one of the foregoing N-vinyl amides with 1 to 95 mole percent of a copolymerizable substituted mono-ethylenically unsaturated monomer may be employed in the foregoing graft polymerization reaction. Such copolymerizable substituted mono-ethylenically unsaturated monomers include vinyl esters, such as vinyl acetate, vinyl propionate, vinyl butyrate, vinyl isobutyrate, vinyl lactate, vinyl caproate, vinyl caprylate, vinyl oleate, and vinyl stearate and halo-substituted vinyl esters; acrylonitrile; styrene, 2-vinyl pyridine, 4-vinyl pyridine; allyl alcohol, allylamine, allyl cyanide, vinyl cyclohexane; acrylic acid; acrylate ester monomers of the formula

wherein $R_2$ represents either a straight or branched alkyl of from 1 to 18 carbon atoms or an alkoxyalkyl in which the total number of carbon atoms in the alkyl groups ranges from 3 to 6.

As examples of acrylate esters having the above formula, the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethylhexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylate monomers such as methacrylic acid, methyl methacrylate, cyclohexyl methacrylate, isobutyl methacrylate, isoamyl methacrylate, β-methoxy ethyl methacrylate and α-(o-chlorophenyl) ethyl methacrylate, β-phenoxyethyl methacrylate, α-phenylethyl methacrylate, phenyl methacrylate, o-cresyl methacrylate, p-cyclohexyl-phenyl methacrylate, 2-nitro-2-methyl propyl methacrylate, di-ethylaminoethyl methacrylate, ethylidene acetate methacrylate and glycidyl methacrylate, including esters of halo acrylic acids, such as methyl-α-chloroacrylate, ethyl-α-chloroacrylate, phenyl-α-chloroacrylate, α-ethyl-acrylic acid; methacrylonitrile; N-alkyl and N-aryl substituted acrylamides such as N-methyl acrylamide, N-ethyl acrylamide, N-propylacrylamide, N-n-butyl acrylamide, N-n-dodecyl acrylamide, N-n-octadecyl acrylamide, N,N-dimethyl acrylamide, N,N-diethyl acrylamide, N,N-di-n-butyl acrylamide, N,N-di-iso-butyl acrylamide, N-cyclohexyl acrylamide, N,N-dicyclohexyl acrylamide, N-phenyl acrylamide, N-p-nitrophenyl acrylamide, N-α-naphthyl acrylamide, N-β-naphthyl acrylamide, N-methyl-N-phenyl acrylamide, N,N-diphenyl acrylamide, N-benzyl acrylamide, N,N-dibenzyl acrylamide; vinyl alkyl ketones. Such copolymers prior to grafting should have the same K-values as above, that is, ranging from about 15 to about 140 and preferably from 130 to 100, or in terms of average molecular weights, ranging from about 10,000 to about 1,000,000.

The graft polymerization reaction may be conducted in alcohol solutions since all of such preformed homopolymers and copolymers are soluble therein. As alcohols we can employ methanol, ethanol, propanol, isopropanol, butanol, secondary butanol, tertiary butanol, hexanol and the like, while employing organic peroxides as catalysts, such as, for example, lauroyl peroxide, benzoyl peroxide, di-t-butyl peroxide, t-butyl perbenzoate, di-t-butyl perphthalate, t-butyl-pentamethyl-ethyl peroxide, t-butyl-triphenylmethyl peroxide, di-t-amyl peroxide, bis-(triethylmethyl) peroxide, bis-(triphenylmethyl) peroxide, 2,5-dimethyl-hexyl-2,5-dihydroxyperoxide, 2,5-dimethyl-2,5-di (t-butyl peroxy) hexane, 2,5-dimethylhexyl-2,5-di(peroxy benzoate), t-butyl hydroperoxide, paramenthane hydroperoxide and the like may be used. The amount of such organic peroxide catalyst may range from about 0.5 to about 12% by weight based on the weight of the preformed homo- or copolymer of N-vinyl lactam.

It is to be noted that the amount of alcohol that is employed as solvent is not critical. Any amount which will form a solution of the preformed homopolymer or copolymer will be sufficient. However, from our experimentation with the present invention we found that from about 5 to about 50 parts by volume of alcohol per one part by weight of the preformed homopolymer or copolymer are usually sufficient to yield a workable solution during the high pressure graft polymerization reaction.

The following examples will illustrate how the graft polymers of the present invention are obtained:

EXAMPLE I

This example will show the preparation of polyethylene in accordance with the procedure of the present invention for comparative purposes with the grafted polymers of the subsequent examples.

A solution of 2 grams of lauroyl peroxide in 250 ml. of tertiary butanol was charged into a 1-liter magnetically stirred autoclave. The autoclave was then evacuated to 30″ of mercury and the vacuum released with prepurified nitrogen to 0 p.s.i.g. This was repeated three times. Ethylene was then admitted at 15,000 p.s.i.g. from a compressor until the autoclave pressure reached 15,000 p.s.i. The autoclave was sealed off from the compressor and stirring and heating begun. At 40° C. and 18,000 p.s.i.g. a reaction began as signified by an exotherm to 52° C. and a pressure to 26,600 p.s.i.g. After eight hours the pressure had fallen to 7100 p.s.i.g. and the temperature was 43° C. The autoclave was vented of excess ethylene and the contents, a hard white mass, was washed with methanol, and then vacuum dried for 24 hours at 80° C. There was obtained 152.3 grams of polyethylene.

The polyethylene was compressed into films which showed tensile strengths of 2000–3000 p.s.i. and 100–300% elongation. The melting temperature as shown by differential calorimetry was 118° C., which is typical of polyethylene of a molecular weight of about 20,000. The intrinsic viscosity measured in Decalin at 135° C. was 1.05.

EXAMPLE II 10 grams of polyvinyl-2-pyrrolidone having a K-value of 90 was dissolved in 250 ml. of tertiary butanol containing 2 grams of lauroyl peroxide as catalyst. The resulting solution was charged to the autoclave, evacuated and filled with nitrogen as in Example I. Ethylene was then admitted from a compressor until the internal pressure of the autoclave was 10,000 p.s.i.g. At this point, stirring and heating of the autoclave was begun. At 50° C., the pressure in the autoclave was 12,600 p.s.i.g., rising to a maximum of 12,900 p.s.i.g. at 52° C. one-half hour later and then falling to 7100 p.s.i.g. and 58° C. one hour later. The autoclave was vented at this point and the white, solid, hard mass was ground in a Waring Blendor with 1500 mls. of water, then with 1500 mls. of methanol and vacuum dried at 70° C. for 24 hours. Both the water wash and the methanol wash were set aside. The white, solid, hard graft polymer thus obtained weighed 172 grams and contained 0.54 percent of nitrogen, corresponding to 4.3 percent of polyvinyl-2-pyrrolidone.

The water wash was examined and found to contain dissolved therein 1.2 grams of low molecular weight water soluble graft polymer. The methanol wash upon evaporation contained 8 grams of unidentified material which was insoluble in water. The amount of polyvinyl-2-pyrrolidone expected to be in the graft polymer is given by the ratio of 10/172 or 5.8 percent. Since the final white solid hard product contained 4.3 percent of polyvinyl-2-pyrrolidone, we determined that 4.3/5.8×100 of 74 percent of the charged polyvinyl-2-pyrrolidone was converted to water and methanol insoluble polyvinyl-2-pyrrolidone/ethylene graft polymer of high molecular weight.

The graft polymer was Carver pressed into clear films which showed tensile strengths of 2,500 p.s.i., very little elongation, and an elastic modulus of 30,000 p.s.i. The crystalline melting point was 124° C. by differential calorimetry.

EXAMPLE III

A solution of 25 grams of polyvinyl pyrrolidone having a K value of 90 and 2 grams of lauroyl peroxide in 500 mls. of tertiary butanol was reacted with ethylene at 15,000 p.s.i.g. as in the procedure of Example I. The final product after washing with methanol and vacuum drying at 80° C. for 24 hours weighed 147 grams and contained 18 percent of polyvinyl-2-pyrrolidone as shown by elemental analysis. From the ratio of 25/147 one would expect a theoretical polyvinyl-2-pyrrolidone content of 17 percent. However, when we calculated as in Example II, i.e., 18/17×100 gives us 100 percent of the charged polyvinyl-2-pyrrolidone which was converted to the water and methanol-insoluble polyvinyl-2-pyrrolidone/ethylene graft copolymer of high molecular weight.

The graft copolymer has a crystalline melting point of 118° C. by differential calorimetry and an intrinsic viscosity of [η] of one gram of the graft polymer in 100 mls. of xylene as measured at 90° C., of 0.95.

A portion of the graft copolymer was extracted with methanol by the Soxhlet technique to further establish the incorporation of the polyethylene into the polyvinyl-2-pyrrolidone backbone. In this extraction, 20 grams of graft copolymer were extracted with methanol for 24 hours. The methanol extract contained 0.3 gram (or 1.5 percent), of methanol-soluble, water-insoluble low molecular weight graft polymer, thereby indicating a high degree of grafting.

EXAMPLE IV

A solution of 50.0 grams of polyvinyl-2-pyrrolidone with a K value of 90 and 2.0 grams of lauroyl peroxide in 500 mls. of t-butanol (J. T. Baker's Reagent Grade) were charged to the autoclave and reacted with ethylene at 15,000 p.s.i.g. as in Example III. The reaction required 4½ hours at 42–48° C. The initial pressure was 18,700 p.s.i.g. and the final pressure 7,400 p.s.i.g. After venting, the autoclave was opened and yielded a semi-gelatinous mass which after dilution with methanol was filtered. The semi-solid residue was ground with water in a Waring Blendor and then filtered and vacuum dried at 100° C. for 8 hours, then 60–65° C. for 24 hours. A final weight of 153.5 grams of white, hard polymer was obtained. This material contained 32% polyvinyl pyrrolidone by elemental analysis. The theoretical value of 32.5% was calculated from the weight of polyvinyl pyrrolidone charged, to the final product weight.

There was present in the methanol wash liquid only 1.5 grams of soluble polymeric material, and in the water wash only 0.7 gram of soluble polymeric materials.

To further test the extent of grafting which took place, a Soxhlet extraction of 20.0 grams of the graft copolymer with methanol was carried out over a period of four days. The methanol contained 0.2 gram of soluble polymeric material which contained 34% polyvinyl-2-pyrrolidone by elemental analysis, indicating that virtually no free polyvinyl-2-pyrrolidone was left behind in the graft polymer.

The properties of this graft polymer were quite different from those of the previous examples in that the graft polymer takes on the infusible character of polyvinyl-2-pyrrolidone. As a consequence, films could not be prepared by Carver pressing at temperatures up to 240° C., at which point some discoloration was noticed. This clearly illustrates that if the graft polymer contains upwards of 30 percent of high molecular weight polyvinyl pyrrolidone, of K–60 to K–90, the graft polymers are not thermoplastic.

EXAMPLE V

Example IV was repeated with the exception that 50 grams of polyvinyl-2-pyrrolidone having a K value of 90 was replaced by an equivalent amount of polyvinyl-2-pyrrolidone having a K value of 30. The yield of the final product was 155.5 grams of somewhat hard, white polymer containing 27 percent of polyvinyl-2-pyrrolidone by elemental analysis and having a melting point of 121° C. by differential calorimetry, a tensile strength of 2500 p.s.i., practically no elongation, and an elastic modulus of 50,000 p.s.i. The intrinsic viscosity $[\eta]$ of one gram of graft polymer in xylene as measured at 90° C. was 1.28, thus indicating a high overall molecular weight. The product was readily pressed into homogeneous films by Carver presser.

The graft polymer was isolated by washing the raw reaction product with n-heptane, in which polyvinyl-2-pyrrolidone is insoluble. A subsequent Soxhlet extraction of the thus-obtained product for 24 hours yielded only 0.5 gram of methanol-soluble product or 2.5 percent, from 20 grams of the graft copolymer. The 2.5 percent methanol-soluble product contained only 52.8 percent of polyvinyl-2-pyrrolidone by elemental analysis, thus making it very clear that more than 97.5 percent of the charged polyvinyl-2-pyrrolidone was grafted.

EXAMPLE VI

This example illustrates the preparation of a graft copolymer of ethylene onto poly(N-vinyl-2-piperidone).

Example V was repeated with the exception that poly-(N-vinyl-2-piperidone) of K–30 molecular weight grade was used in place of poly(N-vinyl-2-pyrrolidone). A final yield of 140 grams of solid white graft copolymer was obtained. This product showed a crystalline melting point of 120° C. (D.S.C.—1), an intrinsic viscosity of 1.30 (xylene at 90° C.), and could be moulded on a Carver press into films of 3,000 p.s.i. tensile strength and approximately 20% elongation.

A Soxhlet extract of 20 grams of this product with methanol for 24 hours yielded: 0.2 gram of soluble material, corresponding to 1.0 percent by weight. The methanol-soluble extract was not soluble in water. The reaction product contained 35.0% of poly(N-vinyl-2-piperidone) as shown by elemental analysis.

EXAMPLE VII

Example V was repeated with the exception that poly (N-vinyl-ε-caprolactam) (K value of 20), was used in place of poly(N-vinyl-2-pyrrolidone). The reaction product was a white solid graft copolymer weighing 163 grams after drying to constant weight in vacuum at 80° C. The product contained 30.0% poly(N-vinyl-ε-caprolactam) as shown by Kjekhdahl $N_2$ analysis, and could be Carver pressed into homogeneous films of about 2,000 p.s.i. tensile strength and 10% elongation. The crystalline melting point was 124° C. by differential calorimetry. This product showed an intrinsic viscosity of 1.0 as measured in xylene at 90° C.

EXAMPLE VIII

When poly (N-vinyl, N'-methyl acetamide), K value 60, was used in the reaction of Example V, a white solid product weighing 170 grams was obtained. This graft copolymer contained 28.4% poly(N-vinyl-N'-methyl acetamide) and could be melt pressed into homogeneous films of good clarity and strength. The intrinsic viscosity of this product measured at 90° C. in xylene was 1.5. A crystalline melting point of 125° C. was observed by differential calorimetry.

EXAMPLE IX

Example V was repeated using K–40 poly(N-vinyl oxazolidinone) in place of poly(N-vinyl-2-pyrrolidone). In this case, a white, solid graft copolymer weighing 150 grams was obtained, containing 33% poly (N-vinyl oxazolidinone) as shown by nitrogen content.

This material was easily pressed into homogeneous films which showed 1500 p.s.i. tensile strength and 40% elongation. The intrinsic viscosity as measured in xylene at 90° was 0.85. A crystalline melting point of 118° C. was observed.

EXAMPLE X

Example V was repeated using vinyl-2-pyrrolidone/vinyl acetate copolymer (60/40 weight ratio) of K-value 40, in place of poly(N-vinyl-2-pyrrolidone). In this case a white, solid graft copolymer weighing 170 grams was obtained. This product was not self-emulsifiable in water. The product was characterized as follows:

Crystalline melting point—116° (DSC-I)
Percent vinyl-2-pyrrolidone/vinyl acetate—29%
$[\eta]$ in xylene 90° C.—0.89
Tensile strength—2060 p.s.i.
Elongation—6.7
Elastic modulus—59,400

The product was found to be soluble in molten paraffin wax to give a viscous melt at 5.0 wt. percent of graft copolymer concentration. The solution was cooled and found to give a paraffin wax blend with improved strength over that of pure paraffin wax.

EXAMPLE XI

Example V was repeated using an N-vinyl-2-pyrrolidone/n-butyl acrylate copolymer of 1:1 weight ratio and K–40 in place of poly(N-vinyl-2-pyrrolidone). The product was a white solid graft copolymer weighing 159 grams, which was not self-emulsifiable. The product had the following properties:

Crystalline melting point—118° C. (DSC–I)
Percent poly(N-vinyl-2-pyrrolidone/butyl acrylate copolymer—30
$[\eta]$ in xylene at 90° C.—0.94
Tensile strength—1260 p.s.i.
Elongation—21.4%
Elastic modulus—21,500

This product was very soluble in paraffin wax, solutions of moderate viscosity being obtained at 30% by weight of the graft copolymer concentration. The cooled wax compositions were seen to have greatly improved physical properties as compared to pure paraffin wax.

The graft polymers as obtained above, because of their tensile strengths and elastic moduli are uniquely adaptable for modification of polyolefinic hydrocarbon compositions such as polyethylene, polypropylene, polybutylene and the like, so as to render the polyolefinic hydrocarbon compositions more readily dyeable. In other words, blends of the graft polymers of the present invention with polyolefinic hydrocarbon compositions are readily taken up by various disperse dyes to yield uniformly colored compositions which may be melt-spun into fibers or films or cast into sheets and films which retain the good physical properties of the polyolefinic hydrocarbon compositions.

The following example will illustrate the useful property of the graft polymers, as above prepared, as an additive for poly(propylene) to enhance the dyeability thereof:

EXAMPLE XII

A mixture consisting of 10 percent by weight of the graft polymer of Example V and 90 percent by weight of poly(propylene) (Pro Fap 6513E) was milled in a Brabender Plastograph at 183° C. for 15 minutes. The smooth, light-colored melt was cast into 20 mil films by Carver pressing. The resulting films were very similar in appearance and mechanical properties to a poly (propylene) control, but were much more readily dyeable, as shown by the following results:

These films were immersed in aqueous solutions of the following dyes: Disperse Orange GRA, Direct Yellow LRR, Basic Blue 5B, Acid Red PG. Each solution was boiled for 30 minutes, and the sample then rinsed with water to remove excess dye. Upon examination of each specimen, it was observed that the polypropylene/graft copolymer blend films were readily dyed with the Direct Orange GRA and somewhat less readily with Basic Blue 5B. The remaining dyes were not effective, both the polypropylene/graft film and the polypropylene control showing little dye pickup. The Direct Yellow LRR-dyed blend film was very deeply dyed throughout and showed no evidence of loss of dye in water washing.

EXAMPLE XIII

Example XII was repeated with the exception that 10 percent by weight of the graft polymer of Example III was employed in the mixture of 90 percent by weight of poly(propylene). The dyeing test results were very similar to those described in Example XII, except that somewhat less dye uptake was observed. This was a consequence of the somewhat lower poly(N-vinyl-2-pyrrolidone) concentration in the film (1.8% poly(N-vinyl-2-pyrrolidone) vs. 2.5% in Example XII).

The graft polymers of the present invention are also useful as processing aids and coatings, such as for speeding extrusion of poly(propylene), and as adhesives for coating polyolefins onto metals such as aluminum and steel.

The graft polymers obtained as above may be chlorinated and chlorosulfonated to yield a variety of new and useful products having utility as viscosity index improvers and ashless dispersions in lubricating oils, pour depressants and sludge inhibitors in petroleum fuels of various types, such as diesel fuels, aviation turbojet fuels, and the like.

We claim:

1. Grafted polymer consisting essentially of at least two polyethylene chains having an average molecular weight of at least 5,000 grafted onto a polymer backbone selected from the group consisting of water soluble homopolymer of N-vinyl amide and copolymer of N-vinyl amide with a copolymerizable substituted monoethylenically unsaturated monomer, said backbone having an average molecular weight of about 10,000 to about 1,000,000.

2. Grafted polymer consisting essentially of at least two polyethylene chains having an average molecular weight of at least 5,000 grafted onto a polymer backbone selected from the group consisting of water soluble homopolymer of N-vinyl lactam and copolymer of N-vinyl lactam with a copolymerizable substituted monoethylenically unsaturated monomer, said backbone having an average molecular weight of about 10,000 to about 1,000,000.

3. Grafted polymer according to claim 1 wherein the backbone is a copolymer of N-vinyl amide and vinyl ester.

4. Grafted polymer according to claim 1 wherein the backbone is a copolymer of N-vinyl amide and vinyl chloride.

5. Grafted polymer according to claim 1 wherein the backbone is a copolymer of N-vinylamide and an acrylate ester of the formula $CH_2=CHCOOR_2$ wherein $R_2$ represents either a straight or branched alkyl of from 1 to 18 carbon atoms or an alkoxyalkyl in which the number of carbon atoms in the alkyl groups is from 3 to 6.

6. Grafted polymer according to claim 2 wherein the backbone is poly(N-vinyl-2-pyrrolidone).

7. Grafted polymer according to claim 2 wherein the backbone is poly(N-vinyl-2-piperidone).

8. Grafted polymer according to claim 2 wherein the backbone is poly(N-vinyl-ε-caprolactam).

9. Grafted polymer according to claim 2 wherein the backbone is a copolymer of 60/40 weight ratio of N-vinyl-2-pyrrolidone and vinyl acetate.

10. Grafted polymer according to claim 2 wherein the backbone is a copolymer of 1:1 weight ratio of N-vinyl-2-pyrrolidone and n-butyl acrylate.

References Cited

UNITED STATES PATENTS

| | | | |
|---|---|---|---|
| 3,049,507 | 8/1962 | Stanton et al. | 260—45.5 |
| 3,322,712 | 5/1967 | Gardner et al. | 260—29.6 |
| 3,479,417 | 11/1969 | Leibowitz et al. | 260—878 |
| 3,417,054 | 12/1968 | Merijan et al. | 260—66 |

FOREIGN PATENTS

| | | | |
|---|---|---|---|
| 555,500 | 9/1957 | Belgium | 260—878 |
| 1,013,020 | 12/1965 | Great Britain | 260—878 |

JOSEPH L. SCHOFER, Primary Examiner

S. M. LEVIN, Assistant Examiner

U.S. Cl. X.R.

161—216; 260—28.5 R, 33.6 UA, 66, 80.3 R, 80.3 N, 80.72, 85.5 A, 85.5 AM, 85.5 B, 85.7, 86.1 N, 87.3, 88.1 PA, 88.3 L, 89.7 R, 94.9 R, 897 B